United States Patent [19]
Justice et al.

[11] Patent Number: 5,593,357
[45] Date of Patent: Jan. 14, 1997

[54] MULTIPLE SPEED-RATIO TRANSAXLE ASSEMBLY FOR AUTOMOTIVE VEHICLES

[75] Inventors: Clinton F. Justice, Northville; William Miller, Canton, both of Mich.

[73] Assignee: Ford Motor Company, Dearborn, Mich.

[21] Appl. No.: 538,932

[22] Filed: Oct. 4, 1995

[51] Int. Cl.⁶ .................................................. F16H 37/08
[52] U.S. Cl. ........................ 475/204; 475/205; 475/281
[58] Field of Search ................................. 475/204, 205, 475/206, 280, 281

[56] References Cited

U.S. PATENT DOCUMENTS

| | | | |
|---|---|---|---|
| 4,056,986 | 11/1977 | Hobbs | 475/205 X |
| 4,509,389 | 4/1985 | Vahratian et al. | 475/205 X |
| 4,702,125 | 10/1987 | Klans | 475/205 |
| 4,841,804 | 7/1989 | Miura et al. | 475/205 X |
| 4,978,328 | 12/1990 | Pierce | 475/205 X |
| 5,069,656 | 12/1991 | Sherman | 475/280 X |
| 5,106,352 | 4/1992 | Lepelletier . | |
| 5,129,871 | 7/1992 | Sandel et al. | 475/281 X |
| 5,429,557 | 7/1995 | Beim . | |
| 5,435,792 | 7/1995 | Justice et al. | 475/281 X |
| 5,474,503 | 12/1995 | Debler et al. | 475/205 |
| 5,503,604 | 4/1996 | Pierce et al. | 475/281 X |

*Primary Examiner*—Charles A. Marmor
*Assistant Examiner*—Peter Kwon
*Attorney, Agent, or Firm*—Frank G. McKenzie

[57] ABSTRACT

An automatic transmission for a motor vehicle includes a chain drive mechanism, three planetary gear units, friction clutches, friction brakes, and an overrunning coupling. Several input shafts of the transmission are adapted to drive elements the sun gears and a ring gear of the planetary gear units.

8 Claims, 2 Drawing Sheets

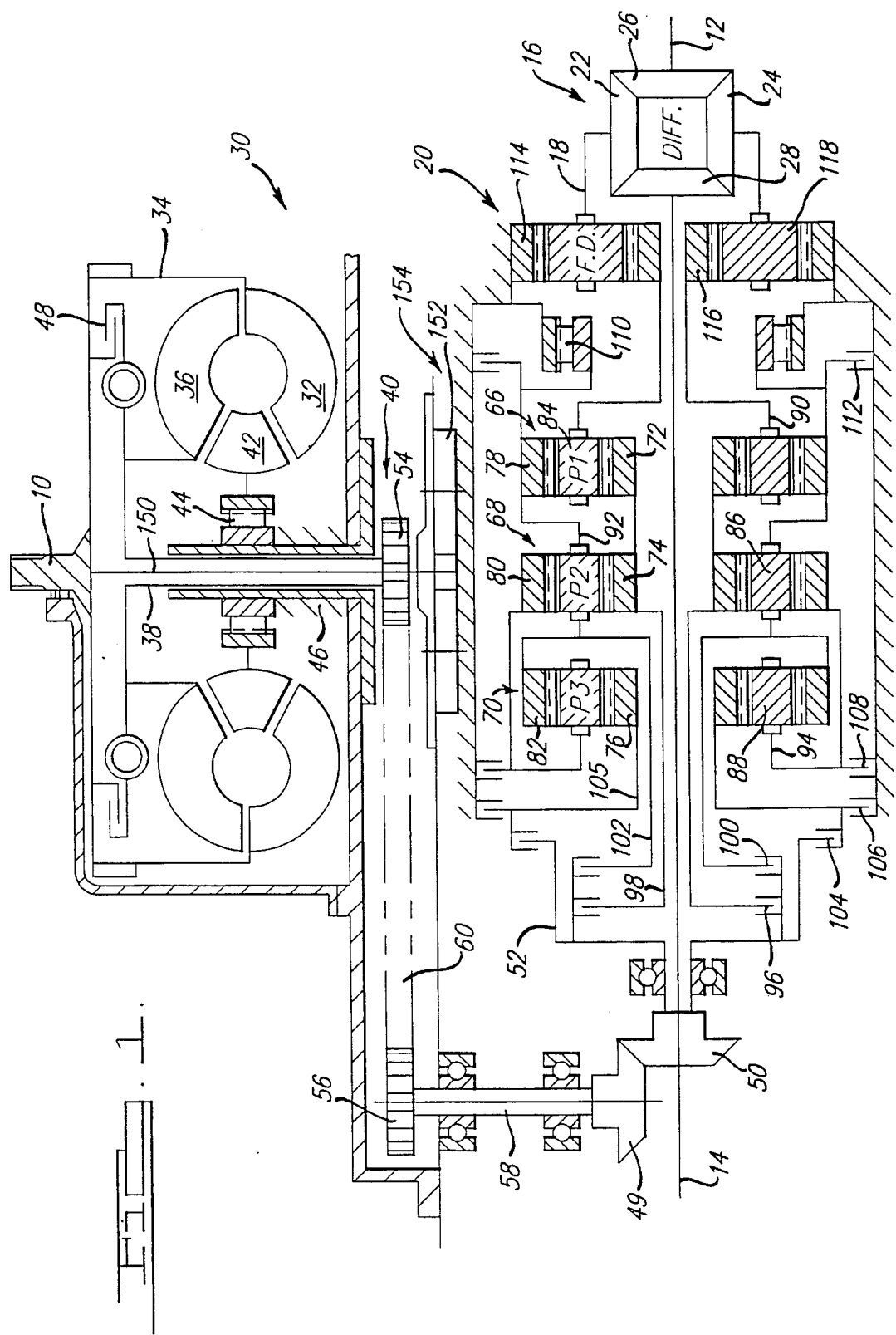

| GEAR | 96 | 108 | 106 | 100 | 104 | 112 | 100 |
|------|----|----|----|----|----|----|----|
| 1st  | X  |    |    |    |    | C  | X  |
| 2nd  | X  | X  |    |    |    |    | O/R |
| 3rd  | X  |    | X  |    |    |    | O/R |
| 4th  | X  |    |    | X  |    |    | O/R |
| 5th  |    |    | X  | X  |    |    | O/R |
| REV  |    |    |    |    | X  | X  |    |
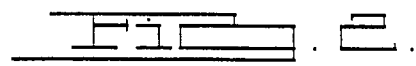
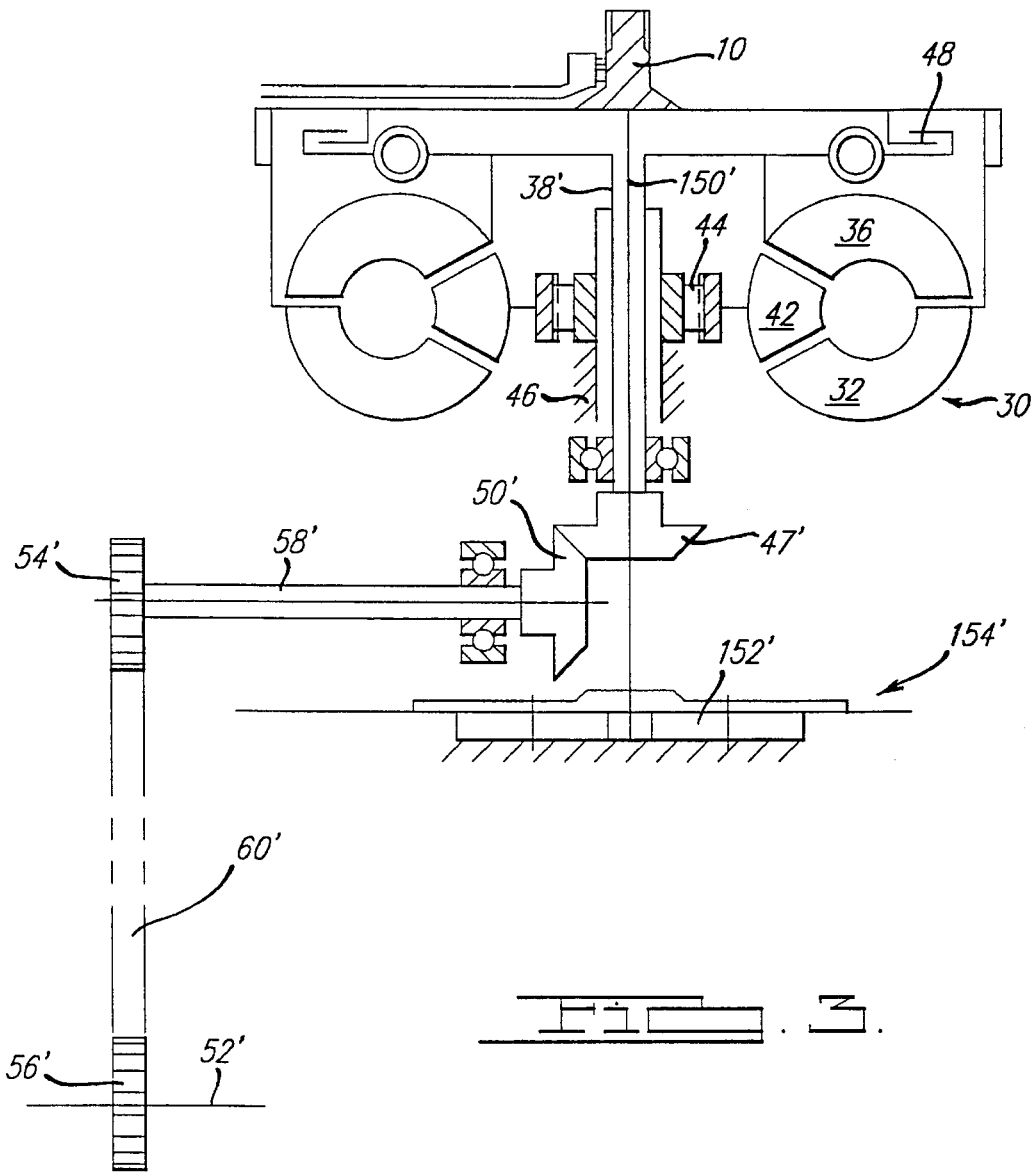

MULTIPLE SPEED-RATIO TRANSAXLE ASSEMBLY FOR AUTOMOTIVE VEHICLES

BACKGROUND OF THE INVENTION

1. Field of the Invention

This invention relates to multiple speed-ratio transmission mechanisms for use in automotive vehicles.

2. Description of Related Art

Four-speed automatic transmissions conventionally include multiple planetary gearsets; friction elements, such as hydraulically-actuated clutches and brakes; a torque converter; and damped torque converter lock-up clutch. These transmissions are employed in rear-wheel drive vehicles where the transmission shaft and engine crankshaft are parallel to the longitudinal axis of the vehicle, and in front-wheel drive vehicles where the transaxle and engine crank shaft are parallel to the transverse axis of the vehicle.

A current trend in the automobile industry is to provide five-speed and six-speed automatic transmissions, which conventionally require three planetary gear units and a large number of friction elements to control the gearing that are required in four-speed transmissions. Automatic transmissions having five or six forward speed ratios require greater size, particularly increased length, to accommodate additional planetary gear units and friction elements. Furthermore, automatic transmissions require nonsynchronous gear shifting, which conventionally requires greater use of one-way couplings and more space within the transmission casing, particularly increased length.

These trends toward features that enhance performance of automatic transmissions have produced a need for an extremely compact transmission suitable for use in a rear-wheel drive vehicle and adapted to fit within a space that is small in comparison to the space required for a conventional five-speed or six-speed transmission. U.S. Pat. Nos. 5,106,352 and 5,429,557 describe a multiple speed automatic transmission having gear units comprising constant mesh gear wheels, a double planetary gearset, and various control brakes.

SUMMARY OF THE INVENTION

A multiple speed automatic transmission according to the present invention includes a first shaft adapted for a drive connection to a power source; first, second and third input shafts; first second and third planetary gear units, each having a sun gear, ring gear, planet pinions meshing with the sun gear and ring gear, and carrier rotatably supporting the planet pinions; a first clutch for alternately driveably connecting and releasing the first member and first input shaft; a second clutch for alternately driveably connecting and releasing the first member and third input shaft. First, second and third gear units, each have a sun gear, ring gear, planet pinions meshing with the sun gear and ring gear, and carrier rotatably supporting the planet pinions; the carrier of the second gear unit, ring gear of the first gear unit, and ring gear of the third gear unit being mutually driveably connected; the carrier of the third gear unit and ring gear of the second gear unit being mutually driveably connected; the sun gears of the first and second gear units and first input shaft being mutually driveably connected; the sun gear of the third gear unit being driveably connected to the third input shaft; and the ring gear of the third gear unit being driveably connected to the second input shaft. A first brake holds the ring gear of the first gear unit against rotation. A first brake releasably holds the sun gear of the third gear unit against rotation. A second brake releasably holds the ring gear of the second gear unit and carrier of the third gear unit against rotation. A third brake releasably holds the sun gear of the third gear unit against rotation.

The brake means includes a friction brake having one element fixed against rotation and a second element connected to the ring gear of the first gear unit; and an overrunning brake for producing a one-way drive connection of the ring gear of the first gear unit and a nonrotating member.

BRIEF DESCRIPTION OF THE DRAWINGS

FIG. 1 is a schematic representation of a kinematic arrangement of a multiple speed transmission and torque delivery path according to this invention.

FIG. 2 is a chart that shows engagement and release patterns for the clutches and brakes illustrated schematically in FIG. 1.

FIG. 3 is a schematic diagram of an alternative torque delivery path according to this invention.

DESCRIPTION OF THE PREFERRED EMBODIMENT

Referring first to FIG. 1, the transaxle is driveably connected to a drive shaft 10, whose axis is substantially parallel to the longitudinal axis of a motor vehicle. The right-hand axle shaft 12 and left-hand axle shaft 14 extend laterally from a differential mechanism 16, which is driveably connected to the carrier 18 of a final drive gearset 20. Carrier 18 drives bevel pinions 22, 24, which are in continuous meshing engagement with side bevel gears 26, 28, driveably connected to the corresponding axle shafts 12, 14.

A hydrokinetic torque converter 30, whose axis is aligned with that of drive shaft 10, includes a bladed impeller wheel 32, driveably connected by impeller casing 34 to drive shaft 10; a bladed turbine wheel 36, driveably connected by a shaft 38 to a chain or belt drive mechanism 40; and a bladed stator wheel 42, connected by a one-way coupling 44 to a transmission casing 46. A bypass clutch 48 alternately connects and disconnects drive shaft 10 and shaft 38. When clutch 48 is disengaged, turbine wheel 36 is connected hydrodynamically to impeller 32. When clutch 48 is engaged, drive shaft 10 is directly connected to shaft 38.

Power carried by shaft 38 is directed laterally by the chain drive mechanism 40 to bevel pinion 49 and gear 50, which is driveably connected to drive member 52. Mechanism 40 includes a first sleeve 54, fixed to shaft 38, a second sleeve 56, fixed to shaft 58, and a chain or belt 60 engaged with the sleeves. Gears 62, 64 are in continuous meshing engagement with their corresponding pinions 56, 58, respectively. Gears 62 and 64 rotate at substantially the same speed; one of these gears may have one more tooth than the other.

The transaxle includes three planetary gear units 66, 68, 70, each including a sun gear 72, 74, 76, a ring gear 78, 80, 82, a set of planet pinions 84, 86, 88, and a planet carrier 90, 92, 94, which rotatably supports the pinions in continuous meshing engagement with the respective sun gear and ring gear.

Connections among the components of the gear units and member 52 are by hydraulically actuated clutches. Various hydraulically actuated brakes hold components of the gearset and shafts against rotation.

Forward clutch 96 alternately driveably disconnects and connects member 52 and input shaft 98, which is driveably connected to sun gears 72, 74.

Clutch 100 alternately driveably connects and releases member 52 and input shaft 102, which is driveably connected to carrier 92 and ring gear 82.

Clutch 104 alternately driveably connects and releases sun gear 76 and member 52 through input sleeve shaft 105.

Brake 106 alternately holds against rotation and releases for rotation sleeve input shaft 105 and sun gear 76.

Carrier 94 and ring gear 80 are alternately held against rotation on the transmission housing and released by engagement and disengagement, respectively, of brake 108.

Carrier 92, ring gear 82, ring gear 78, and the inner race of one-way brake 110 are held against rotation on the transmission housing when brake 112 is engaged and are released for rotation when clutch 112 is released.

The final drive gear unit 20 includes ring gear 114, which is permanently fixed to the transmission housing; sun gear 116, which is permanently connected to carrier 90; and a set of planet pinions 118, which are in continuous meshing engagement with sun gear 116 and ring gear 114.

Drive shaft 10 is driveably connected to pump shaft 150, which drives the rotor 152 of an hydraulic pump 154, preferably a gerotor pump or another fixed displacement pump such as a vane or gear pump. Hydraulic pressure and fluid flow required to actuate and control the clutches and brakes and to supply fluid to the torque converter are provided by the pump.

The schedule of clutch and brake engagement and disengagement shown in FIG. 2 will be used next to describe operation of the gearing in five forward speed ratios and reverse drive. The first forward speed ratio is produced when forward clutch 96 is engaged and the other clutches and brakes are disengaged. During conditions when power is transmitted from member 52 to the axle shafts 12, 14, overrunning brake 110 produces a drive connection between the transmission housing and its inner race. Sun gears 74 and 72 are driven from member 52 through clutch 96. Ring gear 78 is held fixed on casing 46 against rotation due to the drive connection through brake 110. The output is taken at carrier 90 through the final drive gear unit 20, which drives bevel pinions 22 and 24 of differential gear mechanism 16. The axle shafts 12 and 14 are driven through operation of the differential mechanism by side bevel gears 26, 28.

During coast conditions when power is transmitted from the axle shafts to shaft 60, coast brake 112 is engaged because coupling 110 overruns. The torque reaction is provided at ring gear 78 on the transmission casing.

An upshift to the second forward speed ratio occurs by maintaining clutch 96 engaged, as it is during operation in each forward speed ratio, and by engaging brake 108 also. When this occurs, brake 110 overruns, and sun gears 72, 74 are driven by shaft 98 and through clutch 100. A torque reaction is provided at ring gear 80, which is held against rotation due to engagement of brake 108. Carrier 92 drives ring gear 78, and the output is taken on carrier 90 through the final drive gear unit 20 to the differential mechanism 60.

An upshift to the third forward speed ratio results by disengaging brake 108 and engaging brake 106. Again, sun gears 72, 74 are driven from shaft 98 and through clutch 100. A torque reaction is provided by holding sun gear 76 fixed against rotation through engagement of brake 106. Carrier 92, ring gear 82, and ring gear 78 are mutually driveably connected and therefore rotate at the same speed. Carrier 94 of the third gear unit 70 and ring gear 80 of the second gear unit 68 are driveably connected and rotate at the same speed. Sun gears 72, 74 rotate at the same speed due to their mutual connection. The output is taken at carrier 90 of the first gear unit 66.

An upshift from the third speed ratio to the fourth speed ratio results by disengaging brake 106 and engaging clutch 104 instead. In this instance, all of the sun gears 72, 74, 76 are driven by member 52 through clutches 100 and 96. Sun gear 72 and ring gear 78 rotate at the same speed; therefore, the output, carrier 90, rotates at the same speed as that of the sun gears. The fourth speed ratio is a direct drive ratio.

An upshift to the fifth speed ratio results by disengaging clutch 96 and engaging brake 106 instead while maintaining clutch 100 engaged. Sun gear 76 is held against rotation through brake 106. Ring gear 82, carrier 92, and ring gear 78 are driven at the speed of shaft 102 through clutch 100. Carrier 94 and ring gear 80 rotate at the same speed produced in gear unit 70. Therefore, the speed of ring gears 72, 74 is established, and the output is taken at carrier 90.

In order to produce reverse drive, clutch 104 and brake 112 are engaged. Sun gear 76 is driven from member 52 through input shaft 105 due to the engagement of clutch 104. Ring gear 82, carrier 92, and ring gear 78 are held fixed against rotation on the transmission casing due to engagement of brake 112, thereby providing a torque reaction. Therefore, the speed of carrier 94 and ring gear 80 are determined. The output of second gear unit 68 is taken at sun gear 74, which drives sun gear 72 at the same speed. Ring gear 78 is fixed against rotation; therefore, the output is taken at carrier 90.

FIG. 3 illustrates an alternate torque delivery path to that of FIG. 1. Pump shaft 150' drives the rotor 152' of hydraulic pump 154'. Sleeve shaft 38' driveably connects turbine 36 and bevel pinion 47, which is continually engaged with bevel gear 50'. Shaft 58', directed laterally, drives sprocket wheel 54', which is driveably connected by belt or chain 60' to sprocket wheel 56'. Member 52 is driveably connected to sprocket wheel 56' and carries torque to the gear units and shafts of the kinematic arrangement of FIG. 1.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A multiple speed automatic transmission, comprising:

a first member adapted for a drive connection to a power source;

first, second and third input shafts;

first second and third planetary gear units, each having a sun gear, ring gear, planet pinions meshing with the sun gear and ring gear, and carrier rotatably supporting the planet pinions;

first clutch alternately driveably connecting and releasing the first member and first input shaft;

second clutch for alternately driveably connecting and releasing the first member and third input shaft;

first, second and third gear units, each having a sun gear, ring gear, planet pinions meshing with the sun gear and ring gear, and carrier rotatably supporting the planet pinions;

the carrier of the second gear unit, ring gear of the first gear unit, and ring gear of the third gear unit being mutually driveably connected;

the carrier of the third gear unit and ring gear of the second gear unit being mutually driveably connected;

the sun gears of the first and second gear units and first input shaft being mutually driveably connected;

the sun gear of the third gear unit driveably connected to the third input shaft;

the ring gear of the third gear unit driveably connected to the second input shaft;

a first brake for holding the ring gear of the first gear unit against rotation;

a second brake for releasably holding the ring gear of the second gear unit and carrier of the third gear unit against rotation; and a third brake for releasably holding the sun gear of the third gear unit against rotation.

2. The transmission of claim 1 wherein the first brake comprises:

a friction brake having one element fixed against rotation and a second element connected to the ring gear of the first gear unit; and an overrunning brake for producing a one-way drive connection of the ring gear of the first gear unit and a nonrotating member.

3. The transmission of claim 1, wherein the first member is supported for rotation substantially perpendicular to the longitudinal axis of a motor vehicle, further comprising:

a second shaft and third shaft disposed substantially parallel to the longitudinal axis of a motor vehicle;

a bevel gear set having a pinion connected to the second shaft, and a bevel gear meshing with the bevel pinion and driveably connected to the first member;

a chain drive mechanism driveably connecting the second shaft and third shaft; and a torque converter for producing a hydrokinetic drive connection of the third shaft and a power source.

4. The transmission of claim 1 further comprising a third clutch for alternately driveably connecting and releasing the first member and second input shaft for releasably holding the sun gear of the third gear unit against rotation.

5. A multiple speed automatic transmission, comprising:

a first member adapted for a drive connection to a power source;

first, second and third gear units, each having a sun gear, ring gear, planet pinions meshing with the sun gear and ring gear, and carrier rotatably supporting the planet pinions;

the carrier of the second gear unit, ring gear of the first gear unit, and ring gear of the third gear unit being mutually driveably connected;

the carrier of the third gear unit and ring gear of the second gear unit being mutually driveably connected;

the sun gears of the first and second gear units and first input shaft being mutually driveably connected;

a first clutch for alternately driveably connecting and releasing the first member and sun gears of the first and second gear units;

a second clutch for alternately driveably connecting and releasing the first member and sun gear of the third gear unit;

a first brake for holding the ring gear of the first gear unit against rotation;

a second brake for releasably holding the ring gear of the second gear unit and carrier of the third gear unit against rotation; and a third brake for releasably holding the sun gear of the third gear unit against rotation.

6. The transmission of claim 5, wherein the first brake comprises:

a friction brake having one element fixed against rotation and a second element connected to the ring gear of the first gear unit; and an overrunning brake for producing a one-way drive connection of the ring gear of the first gear unit and a nonrotating member.

7. The transmission of claim 5, wherein the first member is supported for rotation substantially perpendicular to the longitudinal axis of a motor vehicle, further comprising:

a second shaft and third shaft disposed substantially parallel to the longitudinal axis of a motor vehicle;

a bevel gear set having a pinion connected to the second shaft, and a bevel gear meshing with the bevel pinion and driveably connected to the first member;

a chain drive mechanism driveably connecting the second shaft and third shaft; and a torque converter for producing a hydrokinetic drive connection of the third shaft and a power source.

8. The transmission of claim 5, further comprising a third clutch for alternately connecting and releasing the first member and ring gear of the third gear unit.

* * * * *